United States Patent [19]

Bourgeois

[11] Patent Number: 4,597,172

[45] Date of Patent: Jul. 1, 1986

[54] APPARATUS FOR MANUFACTURING ANNULAR PILES OF MAGNETIC PLATES FOR ELECTRICAL MACHINES

[75] Inventor: Raymond Bourgeois, La Tour de Scay, F-25640 Roulans, France

[73] Assignee: R. Bourgeois, Besancon, France

[21] Appl. No.: 635,421

[22] Filed: Jul. 30, 1984

[30] Foreign Application Priority Data

Aug. 9, 1983 [FR] France ............................... 83 13104

[51] Int. Cl.$^4$ ............................................. H02K 15/02
[52] U.S. Cl. ........................................ 29/736; 29/596; 29/732; 29/738
[58] Field of Search .................. 29/596, 732, 736, 738, 29/609; 310/216, 217, 42, 261

[56] References Cited

U.S. PATENT DOCUMENTS

| | | | |
|---|---|---|---|
| 3,573,129 | 3/1971 | Zeis | 29/596 X |
| 4,079,512 | 3/1978 | Lakes | 29/596 X |
| 4,080,724 | 3/1978 | Gillette | 29/596 X |
| 4,102,040 | 7/1978 | Rich | 29/596 X |

Primary Examiner—Carl E. Hall
Attorney, Agent, or Firm—Robert E. Burns; Emmanuel J. Lobato; Bruce L. Adams

[57] ABSTRACT

Apparatus for manufacturing piles of magnetic plates of annular shape from stamped sheet metal segments having slots open toward the inside and formed by radially directed arms having enlarged inner ends comprises six operating stations namely a first station in which sheet metal segmented are fed from magazines to build up a stack of plates in which successive layers of segments are angularly staggered, a second station at which the height of a partially formed stack of segments is measured, third and fourth stations for feeding additional thinner segments or thicker segments to the stack according to the measurement in order to obtain a stack of predetermined thickness, a fifth station at which the segments are centered and fitted with rivets and a sixth station at which the stack of segments is compressed and the rivets are set.

15 Claims, 12 Drawing Figures

APPARATUS FOR MANUFACTURING ANNULAR PILES OF MAGNETIC PLATES FOR ELECTRICAL MACHINES

FIELD OF INVENTION

The present invention relates to apparatus for the manufacture of piles of magnetic plates or the like of annular shape, for small and medium-sized electrical machines, in particular alternators for vehicles comprising a motor, from stamped metal sheets, comprising slots open towards the inside, having a narrow part at their inlet and which are formed by arms directed radially towards the inside and becoming thicker at their end.

PRIOR ART

For the consturction of the stator of small and medium-sized electrical machines and in particular for the alternators of motor vehicles, it is known to form piles of rings cut-out by stamping from magnetic metal sheets or the like and to assemble them by riveting or welding. The rings whose diameter is of the order of 50 to 200 mm comprise open slots towards the inside, formed by arms directed radially towards the inside and which become thicker at their free end so that the distance between the ends of the two consecutive arms in the peripheral direction is less than the distance between the bodies of the arms. In fact, these arms form the pole pieces of the stator. Cutting out a whole ring by stamping has certain disadvantages: the quantity of waste material is considerable, since the part of the metal sheet corresponding to the inner diameter of the ring can be used solely for the formation of a ring of smaller diameter, in as much as the thickness of the metal sheet and the diameter corresponds to the required technical characteristics. On the other hand there is also a large quantity of waste sheet metal corresponding to the part of the metal sheet which is located outside the diameter of a ring. The construction of the rings does not make it possible to respect the tolerances of required shape and the exact dimensions both of the rings as well as of the piles of rings, on account of the internal tension created at the time of stamping, which cannot be eliminated easily owing to the closed shape of the ring. This internal tension has an effect on the tolerances of ovalisation and of size of the inner and outer diameteres of the rings and on the parallelism of the two faces of a pile of plates. Frequently it is necessary to carry out additional machining of the stator in order to be able to respect the required tolerances. By way of example, for a stator formed by twenty-one rings having an outer diameter of 117 mm and a thickness of 1 mm, the tolerances required are as follows:

Height (21+0.55) mm and (21−0.05) mm
Parallelism 0.15 mm
Inner diameter (88.9+0.05) mm and (88.9−0) mm The best results obtained in a case of this type with closed rings made in one piece are: as regards parallelism (0.4) mm and as regards the inner diameter (88.9+0.15) mm. It is obvious that as regards the diameter, machining of the stator is obligatory, which consequently increases the manufacturing costs.

SUMMARY OF THE INVENTION

The present invention intends to obviate these drawbacks by providing apparatus for the manufacture of piles and for the assembly of magnetic plates or the like of annular shape on the one hand and making it possible to reduce the quantity of waste and on the other hand to eliminate the internal tension in the stamped rings, thus making it possible to respect the required tolerances without subsequent machining of the stator being necessary.

The apparatus according to the invention is characterised by the following operation:

(a) Annular segments of sheet metal are cut out by stamping, the segments having a peripheral length corresponding to an angle $\alpha = 360°/n$, n being a whole number greater than or equal to two.

(b) From at least n magazines distributed uniformly around a fitting plate, n sheet metal segments are brought radially on a conveyor plate, against the fitting plate, in a fitted position in which the n segments of sheet metal complement each other to form a closed ring and in which they are held by retaining members, (c) The conveyor plates are withdrawn and since the sheet metal segments are retained by the retaining members, after their release from the conveyor plates, they drop vertically onto a stacking disc provided with guide rods which engage in at least two slots of each sheet metal segment, (d) When the stacking disc has received at least one layer of sheet metal segments, at least the following layer of sheet metal segments is deposited on the stack with an angular stagger corresponding to a different angle to $\alpha$, preferably an angle $\alpha/2$ or an uneven multiple of this angle $\alpha/2$, relative to the first layer deposited and, if necessary, this staggering of the arrangement of successive layers of sheet metal segments is repeated several times in order to obtain different superimpositiona of the individual layers of sheet metal segments, (e) after having stacked as many layers of sheet metal segments as is necessary in order to obtain the desired height of the pile of plates, the sheet metal segments of the pile, respectively the layers of sheet metal segments, are centred simultaneously from the inside and from the outside of the pile, and (f) they are fixed together by setting under a press, which expands rivets, constituted by pieces of soft steel wire, inside their housing, in order to make the pile rigid so that the dimensions of the pile made permanently rigid by the said rivets are exactly in accordance with the predetermined dimensions of the pile without subsequent machining.

The essential advantages of the invention is linked with the fact that a ring is formed from juxtaposed segments, their number being able to vary from two to six, but preferably one uses three segments. In this way on the one hand one eliminates the internal tension created on a closed ring at the time of stamping, thus making it possible to respect the required tolerances without machining of the stator being necessary and on the other hand the quantity of waste sheet metal is reduced. The rings and piles are assembled automatically according to stages (b) to (f) above. Centering of the pile of segments from the inside and outside before its permanent assembly makes it possible to obtain the required tolerances. The angular stagger between two consecutive layers is necessary in order to ensure the assembly of the pile of plates and prevent the pile from separating into as many segments of a cylinder as there are segments forming a ring and, on the other hand, in order to make it possible to cancel out possible differences in thickness of the metal sheets.

The staggered arrangement of the layers of segments by an angle α/2 is obtained by the alternate advance of two groups of n conveyor plates uniformly distributed around the fitting plate, each being supplied by 2n corresponding magazines.

According to one variation, the possible differences in thickness of the sheet metal plates affecting the parallelism of the pile are compensated for by rotating the stacking disc by an angle α at least n times, each rotation occurring after a predetermined number of layers of segments have been stacked.

According to one variation and in order to take into account tolerances x of the thickness D of the plates, one first of all forms a pile of plates of a height H' representing approximately 80 to 95% of the prescribed height H, the height H' is measured and, depending on the difference existing between the measured height H' and the prescribed height H, the pile is completed either with at least one layer of sheet metal segments of thickness D', less than D up to the height of approximately (H−D) if H' has not reached approximately (H−D), then the pile is completed by a layer of sheet metal segment D, or the pile is completed by one or more layers of sheet metal segments of thickness D' up to the height H.

It is preferable for reasons of construction and mechanical strength that the last layer of the pile is formed by segments of thickness D. Thus, according to one variation, the partial pile is formed from a number of sheet metal segments of thickness D such that the difference between the height H and the sum of all the maximum positive tolerances of thickness of the sheet metal segments is still at the most equal to D, in the most unfavourable case.

For example, for the formation of a pile of plates of height H=mDo in the case where Do=0.8 to 1.2 mm, preferably 1 mm; x=5% and m=15 to 25, one first of all forms a pile of (m−2) layers and sheet metal segments of thickness of D'=0.7 to 0.8 approximately are used to complete the pile.

The apparatus according to the invention is characterised by the fact that it comprises at least one stacking station and one station for assembly by riveting, by the fact that the stacking station comprises: at least n magazines filled with sheet metal segments, uniformly distributed around a fitting plate whereof the diameter corresponds to the inner diameter of the ring to be completed, n conveyor plates for bringing n sheet metal segments from n magazines against the fitting plate, which is provided with n members for retaining said segments, a stacking disc located below said fitting plate provided with guide rods, at least two per sheet metal segment engaging in corresponding slots in the segments when they drop, after the withdrawal of the conveyor plates, means for ensuring the angular stagger between two consecutive layers of sheet metal segments.

Further features will become apparent from the description of a variation of the apparatus.

The variation of the apparatus will be described as a non-limiting example with reference to the accompanying drawings.

DESCRIPTION OF THE PREFERRED EMBODIMENTS

The apparatus of the invention comprises six main working stations whereof the most important are the stacking station I and the setting station VI.

The working stations in the order in which manufacture takes place are as follows: The stacking station I, the station II for measuring the height of a partial pile, the stations III for stacking plates of thickness D' less than thickness D and IV for stacking plates of thickness D in order to complete the partial pile by layers of thickness D' and/or D according to the result of the measurement at station II, the station V for centering segments and fitting rivets and finally the setting station VI.

Since stacking work is the one which requires the most time, it is possible to provide at least two stacking stations.

The stacking station I illustrated quite diagrammatically comprises six magazines 1a and 1b distributed uniformly around a fitting plate 2. In the example chosen, the annular segments 3 have an angular dimension of 120° and a thickness D. In the example illustrated, the segments 3 shown in dot dash line have been supplied by the magazines 1a and conveyed by the conveyor plates 4a which are shown quite diagrammatically. The magazine 1b, staggered by 60° with respect to the magazines 1a, will supply segments 3 conveyed by the plates 4b in order to form one or more layers of segments staggered by 60° with respect to the segments supplied by the magazines 1a, on the one hand in order to make it possible to ensure the assembly of a pile and on the other hand in order to compensate for possible errors in the nominal value of the thickness of the sheet metal segments. In order to obtain the stagger between two successive layers, the segments of the first layer are conveyed for example by the plates 4a and then by the plates 4b. The segments 3 are held by the retaining members 5 in facing relationship to the magazines and corresponding conveyor plates. The parts of the stacking station I will be described in more detail with reference to FIGS. 1a to 7a. A conveyor device conveys a pile of segments of a height H'<H, H being the required height, to the measuring station II where the height H' is measured exactly and then the pile passes to the stations III and IV comprising, firstly, three magazines and three conveyor plates, secondly, six. The magazines of station III are filled with segments of thickness D' less than D, whereas those of station IV are filled with segments of thickness D.

Figure 1:
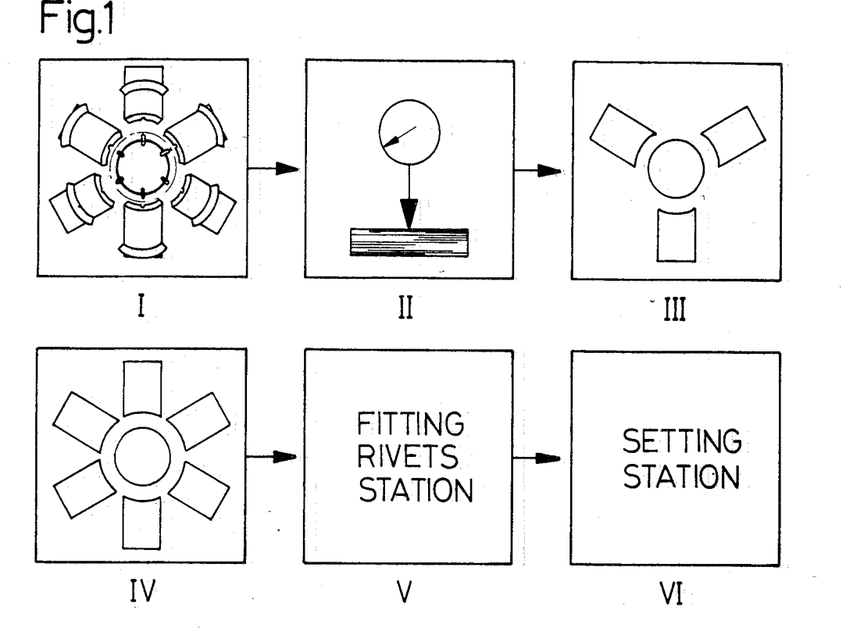
FIG. 1 is a flow chart illustrating six working stations of apparatus in accordance with the invention.
Figure 1A:
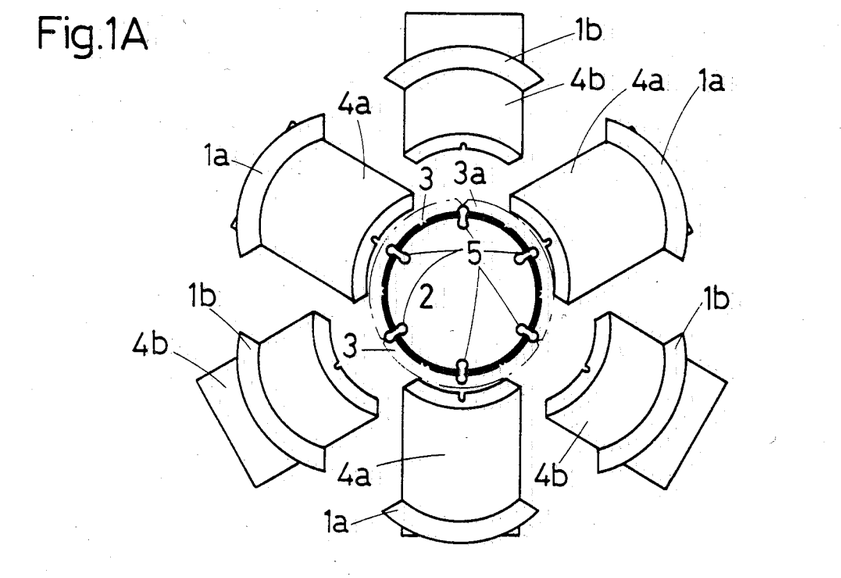
FIG. 1A is a schematic plan view of apparatus at the first working station.

According to the result of the measurement obtained at station II the pile is completed by layers of segments from station III and/or station IV. By way of example, if one must form a pile with a height of 21 mm by sheet metal segments having a thickness of 1 mm, then a pile of 19 layers is formed at the stacking station I, the pile is conveyed to the measuring station II for measuring its height H' and then the pile passes to stations III and IV where it is completed, so that its height is as close as possible to 21 mm and above all within the tolerances required. The segments of station III have for example a thickness D'=0.7 mm. Considering the tolerances mentioned previously, the height of the pile should be between (21−0.05) mm and (21+0.55) mm and the choice of the number of layers of segments from one or other or both stations III and IV is made so that the height H remains within the required tolerances. If the height measured H'=19.2 mm, then it is necessary to complete the pile with two layers of 1 mm from the station IV and thus to obtain a height of 21.2 mm, which is well within the tolerances. Similarly, if H'=19.4 mm the pile will be completed by one layer of 0.7 mm from station III and one layer of 1 mm from station IV. It should be stressed that there are six magazines and conveyor plates in the station, so that if two layers are deposited at the station IV, these layers are staggered by 60°.

Figure 2:
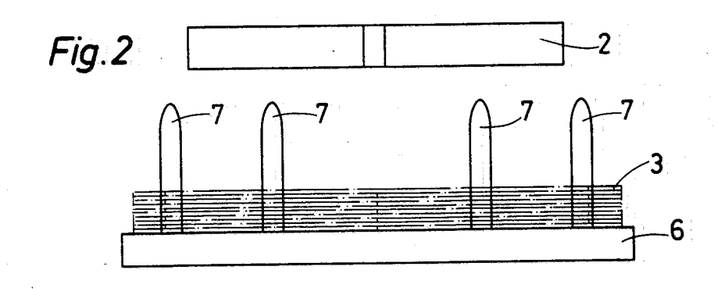
FIG. 2 is a partial side view of the stacking station.
Figure 4:
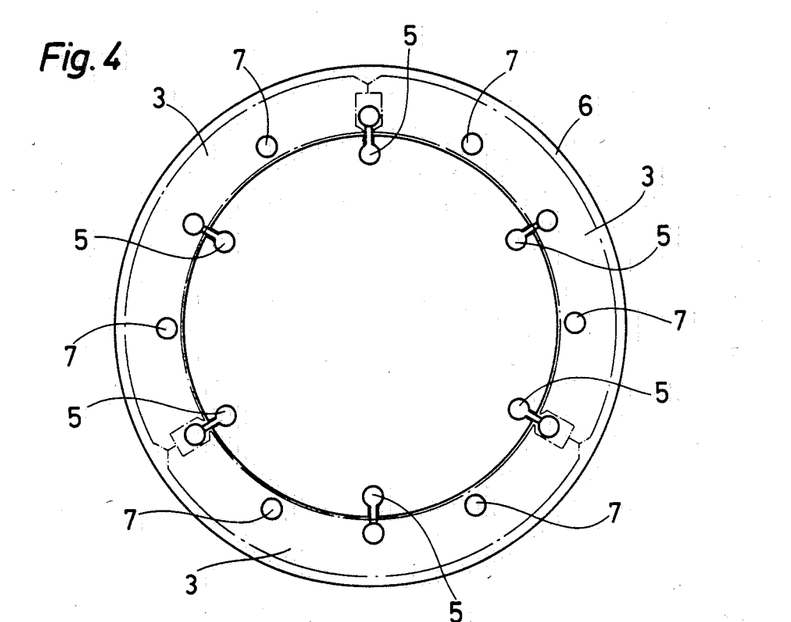
FIG. 4 is a plan view of the stacking station.

FIG. 2 is a partial side view of the stacking station. It shows in particular the fitting plate 2 supporting the retaining members 5 and below, the stacking disc 6 provided with six guide rods 7 uniformly distributed on the disc 6. Each of the rings 3 is guided as it drops by two of the rods 7 which engage in two slots spaced apart by 60°. FIG. 4 is a plan view of FIG. 2. In FIG. 2, several layers of segments are shown in dot dash line and in FIG. 4 the upper layer is shown.

Figure 3:
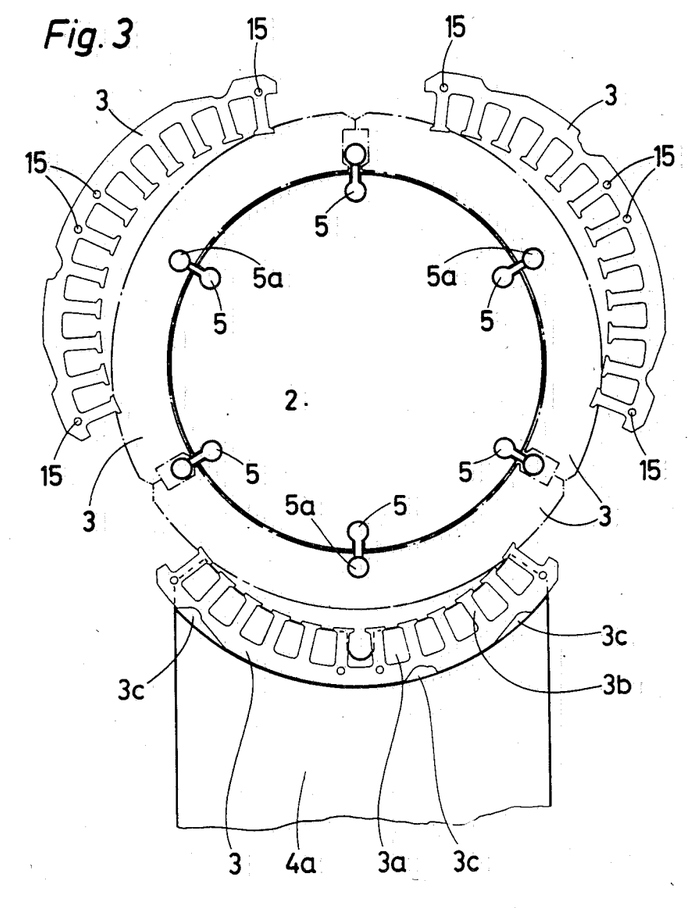
FIG. 3 is a partial plan view showing the assembly of a ring, a single conveyor plate being illustrated.

In FIG. 3, three segments 3 of a ring conveyed by conveyor plates 4a are shown in full line, only one of which conveyor plates is illustrated in the lower part of the drawing, towards the fitting plate 2. The same Figure shows diagrammatically in dot dash lines, the three segments held by the three retaining members 5 opposite the plates 4a before the conveyor plates 4a are withdrawn. The only conveyor plate 4a shown in FIG. 3 is mounted on a slide and it is driven by a double-acting jack. Its end 8 located adjacent to the fitting plate 2 is in the shape of a segment of a ring with dimensions corresponding to those of an annular sheet metal segment 3, formed in a recess 9 in the plate 4a. The recess 9 (FIGS. 5a, 6a, 7a) serves as abutment for an annular sheet metal segment 3 when it is taken over by the conveyor plate 4a. The annular end 8 of a plate 4a or 4b is provided at its centre with a notch 10 of dimensions and shape corresponding to those of the body 5a (which will be described hereafter) of a retaining member 5, projecting radially with respect to the fitting plate 2, in order to allow the conveyor plate 4a or 4b to bring the conveyed segment 3 against the fitting plate 2. The notch 10 is located below a slot 3a limited by two consecutive arms 3b of a segment of a ring 3. The outer periphery of a segment is provided with notches 3c serving for the centering and guiding of segments 3 in the magazines and on the conveyor plates.

Figure 5:
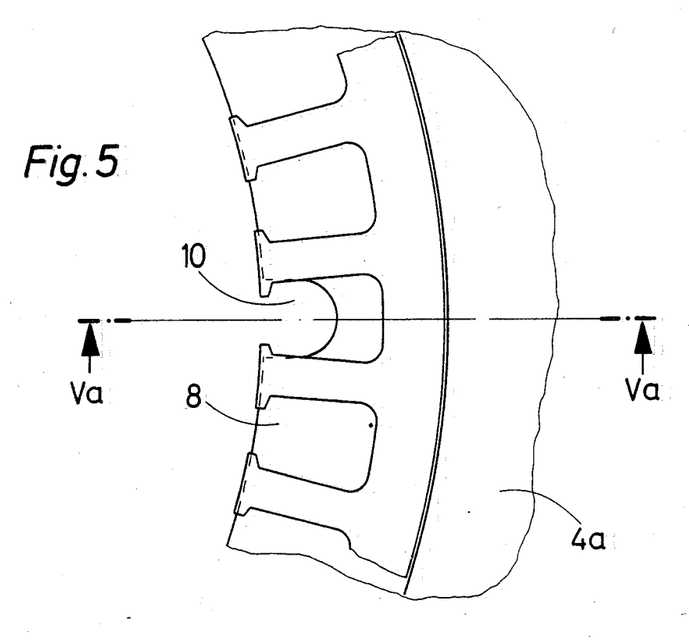
FIG. 5 is a partial plan view of a conveyor plate with sheet metal segment.
Figure 5A:
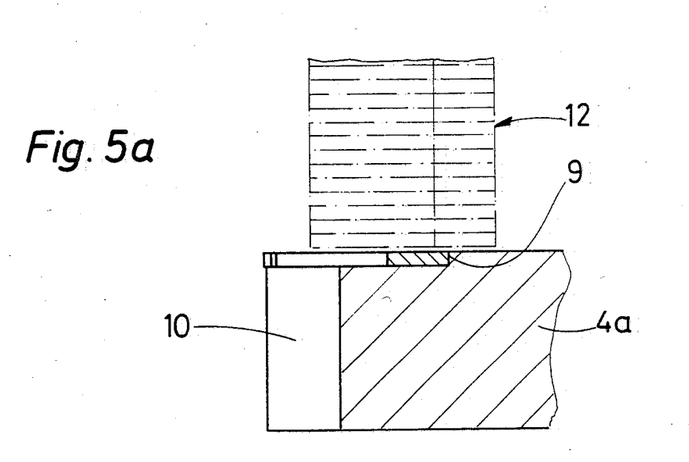
FIG. 5a is a sectional view on line Va—Va of the preceding figure.

FIG. 5 is a partial view of an annular segment 3 taken over by a conveyor plate 4a or 4b. The notch 10 is visible between two consecutive arms 3b of the segment 3. A permanent magnet may be fixed in a housing in the plate in order to ensure holding of the segment 3. FIG. 5a shows a magazine 12 for sheet metal segments 3 in dot dash line, quite diagrammatically and in section. The conveyor plate draws back until its end comprising the recess 9 in the form of a ring is located exactly below the magazine 12, then the lower segment of the pile drops into the recess 9 and the plate 4a is pushed forwards in the direction of the fitting plate 2 (FIGS. 6,6a, 7,7a) in order to supply the segment 3 to the latter and the cycle recommences.

Figure 6:
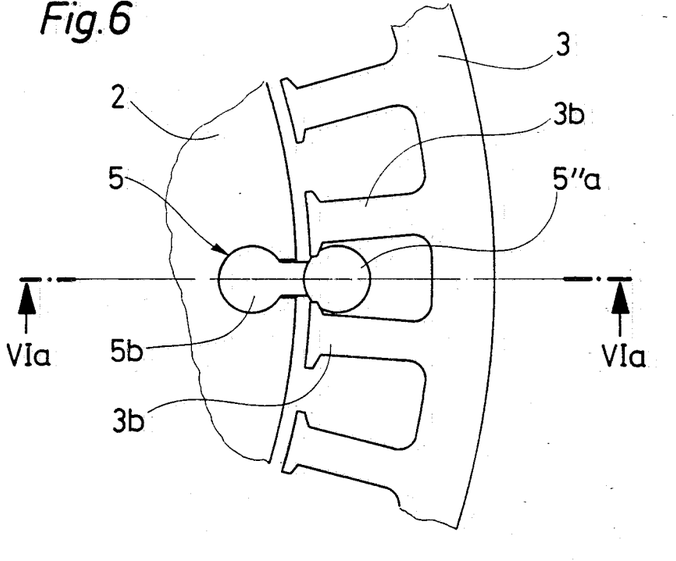
FIGS. 6,6a and 7,7a are views similar to FIGS. 5 and 5a showing the taking-up of a segment by a retaining member.
Figure 6A:
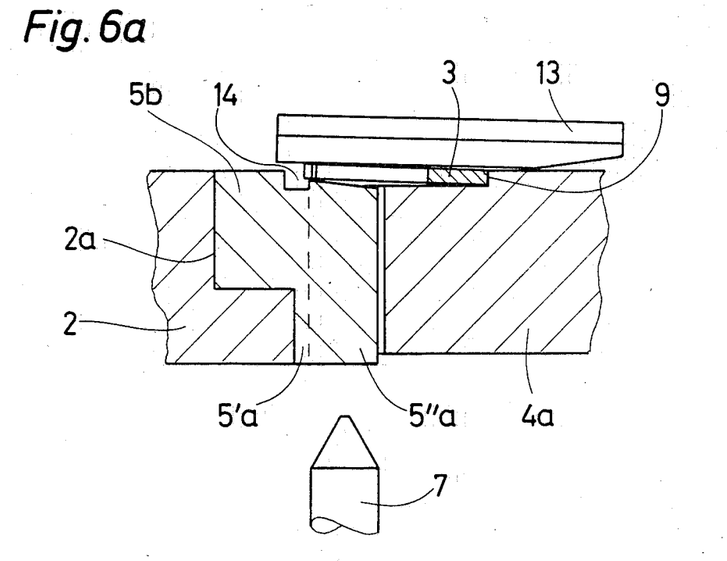

FIGS. 6 and 6a show a segment 3 in the vicinity of the fitting plate 2. FIG. 6 shows solely part of the fitting plate 2 with a retaining member 5 and a segment 3, the conveyor plate has not been shown. FIG. 6a is a sectional view of a conveyor plate 4a, the segment 3, the retaining member 5, the fitting plate 2 and a member 15 assisting the retaining member 5, which will be described hereafter.

The retaining member 5 comprises a body 5a projecting with respect to the fitting plate 2 and formed by two parts, a first prismatic part 5'a whereof the width is less than the peripheral distance between the ends of two consecutive arms 3b of the segments 3 and a second cylindrical part 5"a whereof the diameter is greater than the distance between the ends of two consecutive arms 3b and less than the distance between the bodies of the said arms. This second part 5"a may also be prismatic in as much as its width satisfies the same conditions as the diameter of the cylindrical part. The retaining member 5 is inserted in a notch 2a approximately of cylindrical shape of the fitting plate 2 by a body 5b whose shape and dimensions correspond to those of the notch 2a in the plate 2. The upper side of the cylindrical part 5"a is inclined, the higher part being located adjacent to the prismatic part 5'a and forming a recess 14 therewith.

Figure 7:
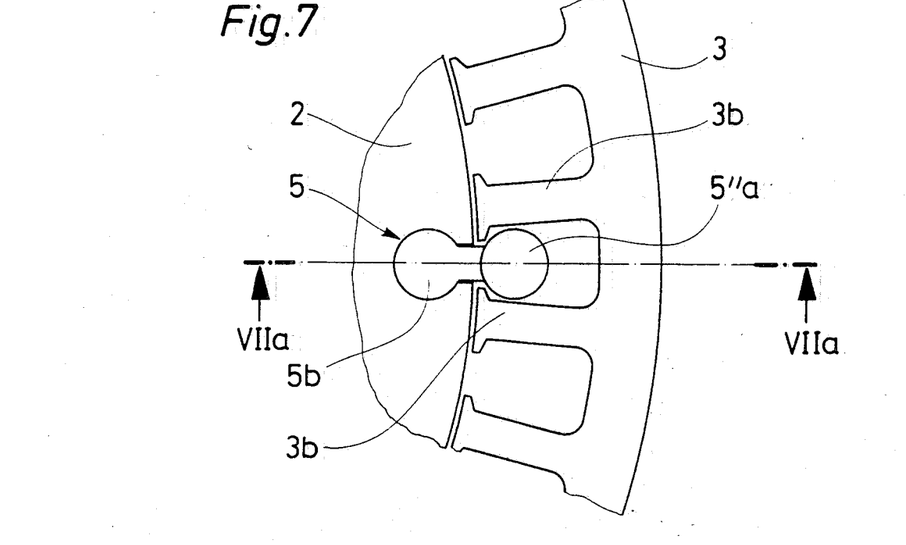
Figure 7A:
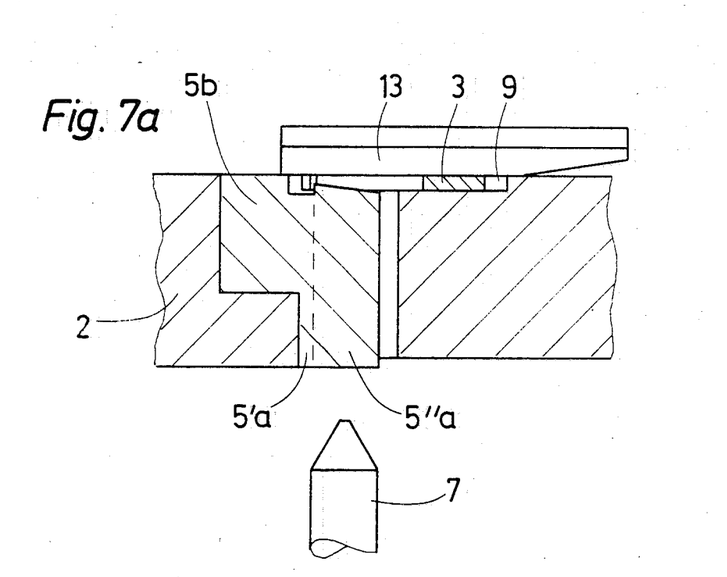

When the conveyor plate 4a arrives in the vicinity of the fitting plate 2, a flat member 13 subject to a resilient vertical force presses the segment 3 against the plate 4a and assists the retaining member 5 in receiving the latter. When the plate 4a arrives against the body 5a, the ends of the two arms 3b located below the notch 10 in the conveyor plate 4a slide on the inclined face of the part 5"a and the segment 3 is located in the inclined position as shown in FIG. 6a. The pressure exerted during this time by the member 13 ensures permanent contact of the segment with the conveyor plate 4a and the member 5 and prevents the segment 3 from leaving the plate 4a. When the ends of the arms 3b project beyond the upper face of the cylindrical part 5"a, they drop into the recess 14 in the retaining member 5 and the segment 3 resumes its horizontal position. The distance between the highest point of the upper face of the part 5"a and the support face of the member 13 must be of the order of 30 to 40% of the thickness of the segment in order to ensure satisfactory retention of the segment at the time of withdrawal of the conveyor plate. When the conveyor plate 4a has reached the end of its travel in the direction of the fitting plate, it is consequently moved in the opposite direction as shown in FIG. 7a, but the segment 3 cannot follow it, since the ends of the arms 3b abut against the cylindrical part 5"a whereof the diameter is greater than their distance. The member 13 also ensures the vertical retention of the segment 3 during the withdrawal of the plate 4a. When the plate 4a is no longer in contact with the segment 3, the latter drops vertically onto the stacking plate 6 guided by the rods 7. It is obvious that the same operations are carried out simultaneously by the three conveyor plates 4a (respectively 4b).

In order to ensure the angular stagger between two successive layers, segments are supplied alternately from the magazines 1a and 1b, by the conveyor plates 4a, 4b respectively. After having formed a partial pile of height H', the stacking disc 6 is brought to the measuring station II and then to the stations III and IV where conveyor plates and fitting plates identical to those described operate.

According to one variation, in order to compensate for the errors of thickness of sheet metal segments having an influence on the parallelism of the pile, the stacking disc 6 is rotated three times by an angle of 120°. The first rotation takes place when one-third of the height of the pile is reached and two-thirds and finally a last time before the removal of the pile when H' is reached. Naturally, the number of rotations may be greater than three, but preferably a whole multiple of three in the present case and generally, a whole multiple of n, the angle of rotation being $\alpha$.

It is possible to form a ring with a greater number of segments, for example, six. In this case, the parts of the installation are the same as those described previously as regards their structure, but the number of magazines, conveyor plates and retaining members must be adapted to the number of segments constituting a ring.

After the pile of plates passes through station II, III and IV, the pile arrives at station V, for the fitting of the rivets. The rivets, consisting of a single piece of soft steel wire, are introduced into the holes 15 (FIG. 3) in the superimposerd segments which thus form vertical passages. Before fitting of the rivets, the pile is clamped between two shells in the shape of half a cylinder, in order to ensure approximate centering of the pile.

After the fitting of the rivets, the stacking disc is brought to the setting station VI.

Figure 8:
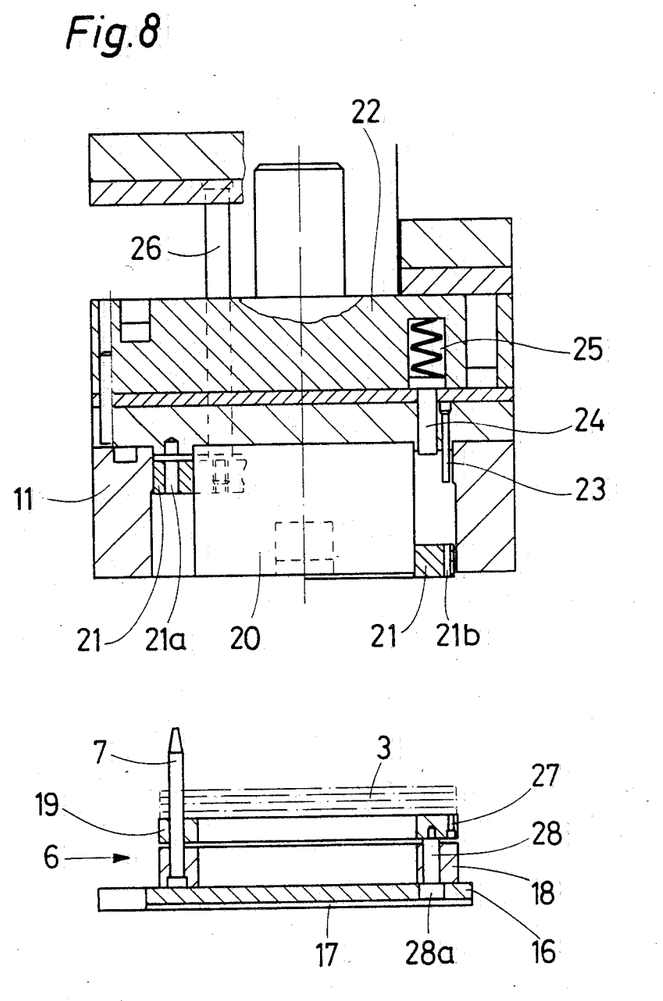
FIG. 8 is a side view in section of certain members of the fitting station.

FIG. 8 shows a more detailed view of the stacking disc 6 and of the setting device. The stacking disc 6 is composed of a plate 16 whose shape is cylindrical or rectangular and provided on its lower side with two grooves 17 engaging on two corresponding rails of the transfer device. Fixed to the plate 16 is a ring 18 through which the guide rods 7 pass, (only one of which is shown in this case), a second removeable ring 19 provided with cylindrical passages for the guide rods 7 is suspended from the first ring 18 by small springs (not shown). Arranged vertically with respect to the holes 15 in the segments, the ring 19 is provided with cylindrical orifices 27 inside which are located points whereof the length is slightly less than that of the orifices 27. The points are provided at their lower end with a head preventing them from leaving the ring 19 by passing through the latter in an upwards direction. Screws 28 uniformly distributed are screwed on the lower side of the ring 19. The screws 28 pass freely (without being screwed) through the ring 18, whereas their head 28a is housed in a cylindrical passage of plate 16 located vertically with respect to one or other of the grooves 17.

The setting device essentially comprises a mould 11, a plug 20 the purpose of which is to centre the layers of segments from the inside and outside and thus to ensure that the inner and outer diameters of the pile of plates located on the ring 18 are correct before setting, the mould and the plug being associated with a press 22. Located between the mould 11 and the plug 20 is the stripping member 21, in this case illustrated in two extreme positions, the lower position on the right of FIG. 8 and the upper position on the left of the same Figure. Setting is carried out in the following manner: The press 22 lowers the mould 11 and the plug 20 onto the pile of plates 3 supported by the stacking disc 6 described previously. The stripping member 21 in the lower position comes into contact with the pile and as the press descends, the mould 11 and the plug 20 centre the successive layers of plates, whereas the stripping member is provided with a series of orifices 21a for the passage of guide rods 7 and a series of orifices 21b for the passage of rivets and the setting points 23. The outer diameter of the plug 20 and the inner diameter of the mould 11 correspond exactly to the inner diameter, respectively the outer diameter of the pile of plates chosen. When the stripping member approaches the end of its travel (upper position) it comes into contact with pins 24 distributed uniformly and which are under the action of springs 25. The pins 24, under the action of the springs 25, and the ring 18, under the action of the springs 28, themselves subjected to the force of ramps comprising springs housed in the groove 17 compress the pile of plates and centre the rivets with respect to the pile. Centering is carried out on the one hand by the points 23 in the space left free in the orifices 21b of the stripping member in the upper position, and on the other side in the cylindrical orifices of the ring 19 by the corresponding points, when the suspension springs are compressed. Once the centering of the rivets is achieved, the press 22 continues to descend and setting takes place, the heads of the rivets being of the same size on both sides of the pile. The upper heads are obtained by the action of the points 23 and the lower heads by the points housed in the cylindrical orifices 27 in the ring 19 of the stacking disc 6. At the end of setting, the press once again ascends and the pile is expelled by the descent of the stripping member 21 under the action of a vertical force exerted by rods 26 driven by a jack.

With apparatus of this type, the applicant has manufactured piles of sheets having a nominal height of 21 mm, thus obtaining piles whereof the defect of parallelism between the two faces of the pile is 0.15 mm, whereas for piles formed with closed rings, this defect is at the minimum 0.4 mm.

The piles of plates may be assembled in another manner, for example by welding, but before the latter it is absolutely necessary to centre the pile of plates with a device such as that described previously, provided with a mould and a plug.

What is claimed is:

1. Apparatus for manufacturing piles of magnetic plates of annular shape for electrical machines from stamped sheet metal segments having slots open toward the inside and formed by arms directed radially inwardly and growing thicker at their ends, characterised by the fact that it comprises at least one stacking station and a station for assembly by riveting, whereof the stacking station comprises: at least n magazines filled with segments of sheet metal uniformly distributed around a fitting plate of which the diameter corresponds to the inner diameter of the ring to be completed, n conveyor plates for bringing n segments of sheet metal from n magazines against the fitting plate which is provided with n members for retaining said segments, a stacking disc located below said fitting plate provided with guide rods, at least two per sheet metal segment, engaging in corresponding slots in the segment as they drop after the withdrawal of the conveyor plates, and means for ensuring an angular stagger between two consecutive layers of sheet metal segments.

2. Apparatus according to claim 1, characterised by the fact that each of the retaining members, fixed on the fitting plate where they are mounted in a removable manner, comprises a body projecting radially with respect to the said plate, said body being constituted by two parts, a first part which is closer to the periphery of the fitting plate of approximately prismatic shape and whereof the width is less than the peripheral distance between the thickened ends of two consecutive arms of a segment and a second part extending radially following the first of prismatic or cylindrical shape and whereof the width, respectively the diameter, is greater than the distance between the thickened ends of two arms of a segment and less than the width of a slot, the upper face of the second part being inclined so that its higher part forms a recess with the upper face of the first part and the lower part of the inclined face is located adjacent and approximately at the same height as the surface of the conveyor plate supplying a sheet metal segment, that the front wall of the end of the conveyor plate is provided with a notch of a shape corresponding to that of the body of the retaining member, projecting and of greater dimensions than those of said body.

3. Apparatus according to claim 2, characterised by the fact that the end of each conveyor plate supporting a segment of sheet metal is in the shape of a segment of a ring formed in a recess whereof the height is equal to the thickness of sheet metal ring segment.

4. Apparatus according to claim 2, characterised by the fact that the retaining member also comprises a member exerting a vertical pressure on the sheet metal segment supplied by a conveyor plate under the action of a resilient member in order to ensure that the sheet metal segment is held by the retaining member.

5. Apparatus according to claim 2, characterised by the fact that the means ensuring the angular stagger between two successive layers are composed of 2n magazines uniformly distributed around the fitting plate, associated with which magazines are 2n conveyor plates and 2n retaining devices, the sheet metal segments forming two staggered successive layers are supplied for the first layers from n first magazines uniformly distributed around the fitting plate and for the following layers by the n remaining magazines.

6. Apparatus according to claim 2, characterised by the fact that the stacking disc is provided with means which cause it to rotate by an angle $\alpha$ at least n times when a pile of plates is being formed.

7. Apparatus according to claim 2, characterised by the fact that it comprises a station for measuring the height H' of the partial pile, followed by two stacking stations each being provided by n magazines, the magazines of the first of the stations being filled with sheet metal segments having a thickness D' and those of the second station with segments of thickness D, by the fact that the magazines and the conveyor plates of the stacking stations located after the measuring station are arranged so that the segment of a layer deposited by one of the stations are staggered by an angle $\alpha/2$ with respect to those deposited by the other station.

8. Apparatus according to claim 2, characterised by the fact that it comprises a station for measuring the height H' of the partial pile, followed by two stacking stations each being provided by n magazines, the magazines of the first of the station being filled with sheet metal segments having a thickness D' and those of the second station with segments of thickness D, and by the fact that the magazines and the conveyor plates of the stacking stations located after the measuring station are arranged so that the segment of a layer deposited by one of the stations are staggered by an angle $\alpha/2$ with respect to those deposited by the other station.

9. Apparatus according to claim 7, characterised by the fact that it comprises a station for measuring the height H' of the partial pile followed by two stacking stations the first being provided with n magazines containing sheet metal segments of thickness D' and the second with 2n magazines containing sheet metal segments of thickness D.

10. Apparatus according to claim 8, characterised by the fact that it comprises a station for measuring the height H' of the partial pile followed by two stacking stations the first being provided with n magazines containing sheet metal segments of thickness D' and the second with 2n magazines containing sheet metal segments of thickness D.

11. Apparatus according to claim 1, characterised by the fact that the station for assembling by riveting comprises means for fitting rivets in a single piece constituted by pieces of soft steel wire having a diameter slightly less than that of the holes and a length greater than the thickness of the finished pile.

12. Apparatus according to claim 6, characterised by the fact that a station for setting rivets fitted at the station for assembling by riveting comprises a press with which are associated a mould co-operating with a plug in order to effect centering of the pile of plates supported by the stacking disc, by the fact that this station comprises a device for centering of the rivets with respect to the pile of plates before their setting, this device being composed of resilient means acting on the upper and lower parts of the said piles and by the fact that after the centering of the sheet metal segments respectively of the layers of sheet metal segments constituting the pile, simultaneously, from the inside of the pile, by means of the plug, from the outside of the pile by means of the mould, the plug and the mould, moved by the press, closely following respectively the inner periphery and the outer periphery of the pile, points, acting on each end of the rivets, expand the latter in their holes and make the heads for retaining each rivet, in order to make the pile permanently rigid.

13. Apparatus for manufacturing piles of magnetic plates of annular shape for electrical machines from stamped sheet metal segments having slots open toward the inside and formed by arms directed radially inwardly and having enlarged ends comprising, a stacking station comprising a fitting plate the diameter of which corresponds to the inner diameter of the annular shape to be produced, at least n magazines with segments of sheet metal distributed around said fitting plate means for feeding segments of sheet metal inwardly against said fitting plate, means for retaining said segments, a stacking disc located below said fitting plate and provided with guide rods received in slots of said segments, segments being fed successively from said magazines to form a stack of segments on said stacking disc, a measuring station comprising means for measuring the height of a stack of segments formed on said stacking disc, first and second segment adding stations comprising means for adding thinner segments or thicker segments to said stack of segments to bring said stack to a predetermined height, a centering station comprising means for centering the segments and fitting rivets in aligned holes in the segments and a setting station comprising means for compressing the stack of segments and setting the rivets.

14. Apparatus according to claim 13, in which said stacking station comprises means for angularly staggering successive layer of segments.

15. Apparatus according to claim 13, in which said segment feeding means comprises conveyor plates movable radially of said fitting plate to convey said segments from said magazines to said fitting plate.

* * * * *